P. J. ANDERSON.
HAY SCATTERER.
APPLICATION FILED MAY 14, 1913.
1,077,967.
Patented Nov. 11, 1913.
2 SHEETS—SHEET 1.
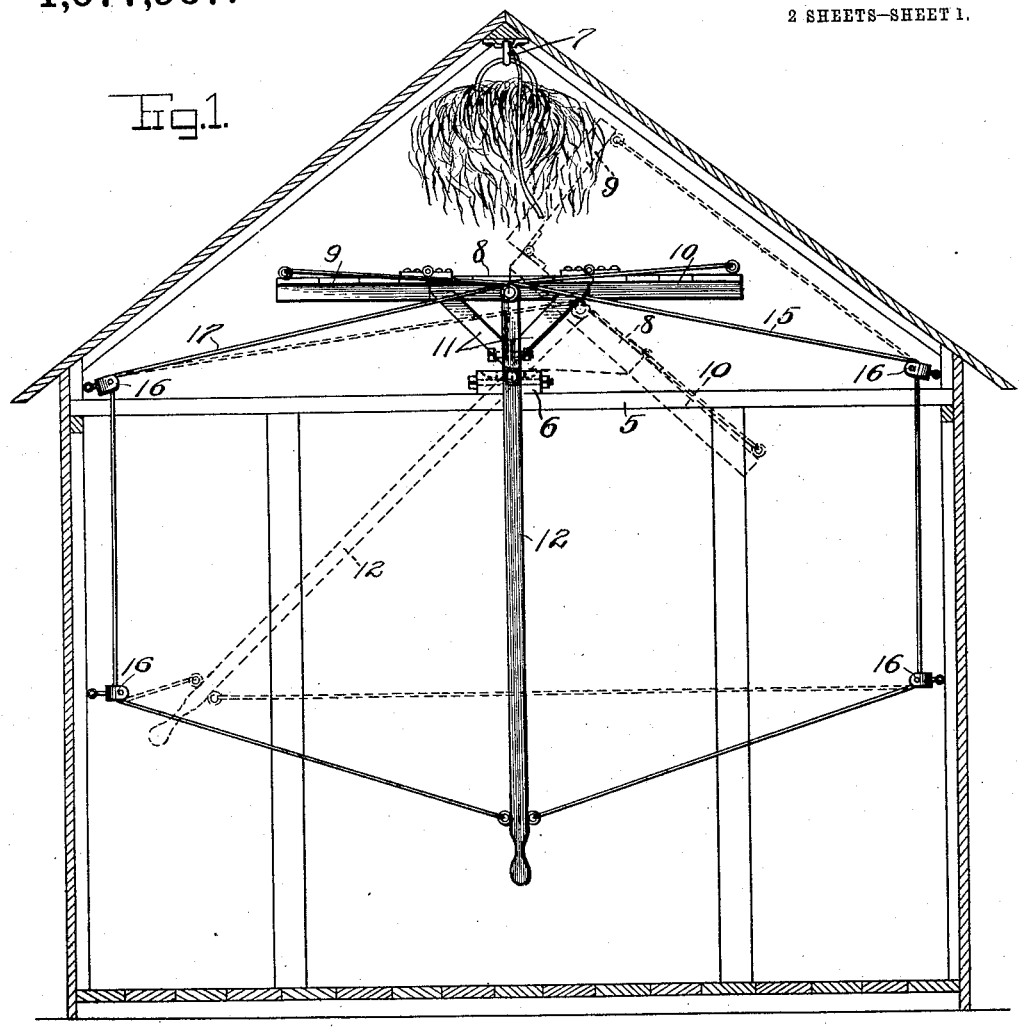
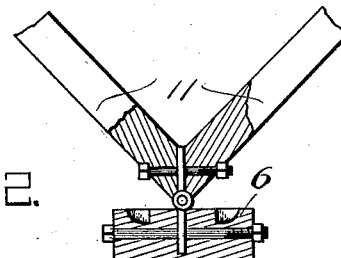
Witnesses
Jno. R. Woodworth
M. E. Lowry
Inventor
Peder J. Anderson,
By A. M. Wilson
Attorneys

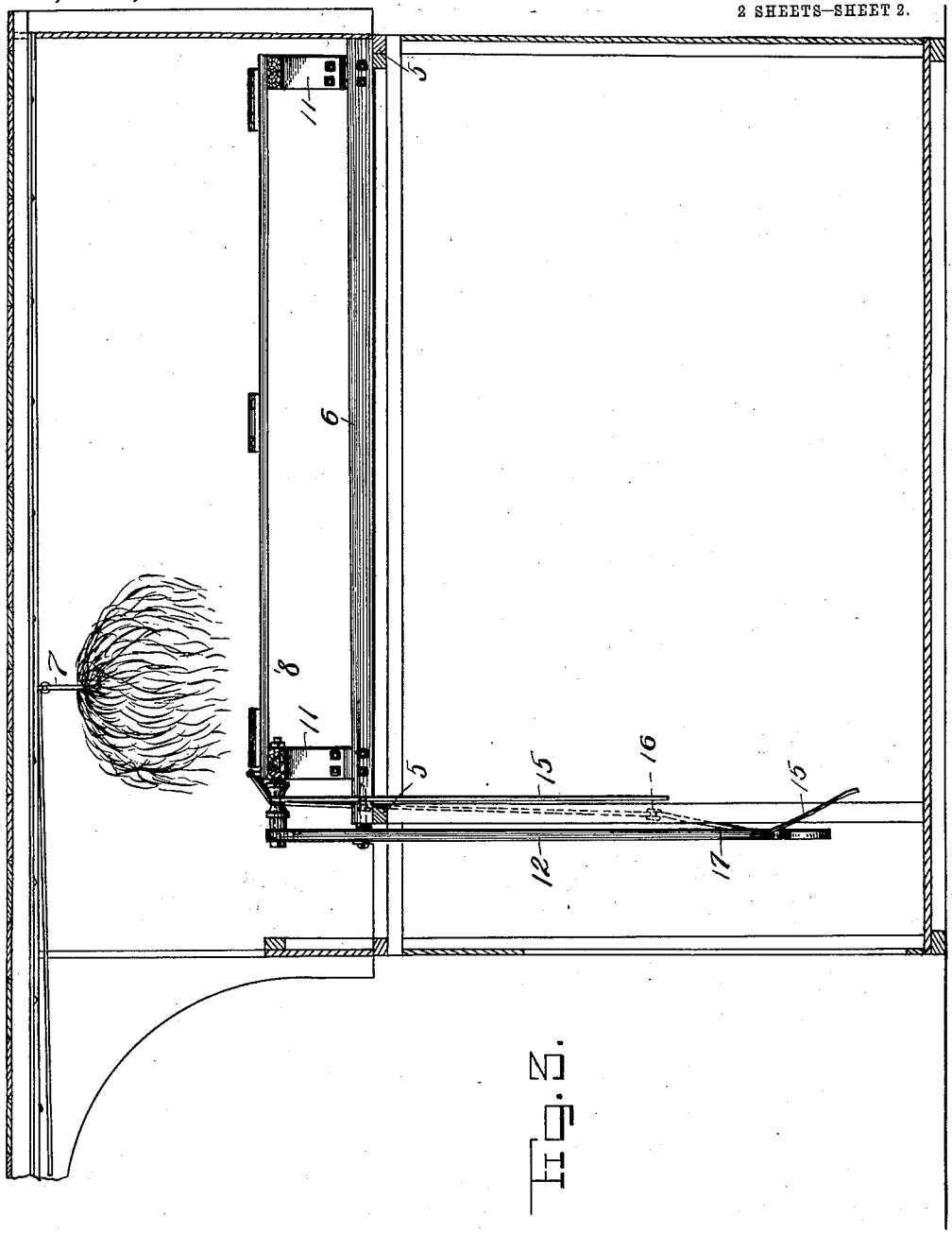

UNITED STATES PATENT OFFICE.

PEDER J. ANDERSON, OF STOUGHTON, WISCONSIN.

HAY-SCATTERER.

1,077,967.　　　　Specification of Letters Patent.　　Patented Nov. 11, 1913.

Application filed May 14, 1913. Serial No. 767,690.

*To all whom it may concern:*

Be it known that I, PEDER J. ANDERSON, a citizen of the United States, and residing at Stoughton, in the county of Dane and State of Wisconsin, have invented certain new and useful Improvements in Hay-Scatterers, of which the following is a specification.

This invention relates to certain new and useful improvements in hay scatterers, such as are employed in the mows of barns or the like for receiving a quantity of hay delivered thereto by the usual hay fork and delivering or scattering the load of hay thus received into portions of the mow to which the hay may not be delivered direct from the hay fork.

The invention has for its object the provision of a device of this character in which the hay may be discharged from the carrying platform in such a manner as to cause it to be projected into the remotest portions of the mow.

A further object of the invention is to provide a device of this type in which the receiving platform has hinged end sections adapted to be operated simultaneously with the tilting of the receiving platform so as to effect a better discharge of the hay from the platform.

A still further object of the invention is to provide in a device of this character, a receiving platform consisting of a plurality of hinged sections which may be folded in superposed relation if so desired and the platform swung out of the way so that the hay may be dropped directly from the fork into the mow.

Other objects of the invention will appear as the same is hereinafter more fully described and then claimed, and in describing the invention in detail, reference will be had to the accompanying drawings, forming a part of this specification, and wherein like numerals of reference will be employed to designate like parts throughout the different views, in which:—

Figure 1 is a transverse vertical sectional view of a barn showing in side elevation a hay scatterer in accordance with this invention. Fig. 2 is an enlarged detail view of a part of the tiltable platform. Fig. 3 is a longitudinal sectional view of a portion of a barn or like building, the hay scatterer being shown partly in side elevation and the platform in section.

To put my invention into practice, I provide on the supporting beams 5 of the barn, a suitable support such as a cross-beam 6, on which is mounted the tilting platform which receives the hay delivered by the fork 7. Detailed construction of the fork, its carrier, and the traveler therefor, and the manner in which the same is moved along the traveler are omitted as the same are deemed wholly unnecessary to a thorough understanding of the present invention.

The platform which is adapted to receive the hay from the fork 7 consists of a central section 8 and end sections 9 and 10 respectively, which are hinged to the respective longitudinal side edges of the central section 8. This platform as a whole, is supported at the ends, and also intermediate the ends if deemed desirable, by pairs of braces 11, the braces of each pair being disposed V-shaped as best seen in Fig. 2, and which braces or supports are hinged to the crossbeam 6. Pivotally-connected to the outer end of the cross-beam 6 is an operating lever 12 which extends downwardly a sufficient distance to bring it within ready reach of an operator from the floor of the barn. At its upper end, this lever is connected by a bolt 14 or in any other suitable manner with the adjacent end of the central section 8 of the platform.

The platform in receiving position is horizontal, and is adapted to be tilted to either side of the supporting beam 6, so as to discharge the hay from the platform into remote portions of the mow. To facilitate this discharge, I provide the hinged end sections 9 and 10, these sections being operated so as to move them toward closed position as the platform is tilted, and thus give an added impetus to the load of hay being discharged. To effect this operation of the end sections 9 and 10, I attach to the section 9 at one corner thereof as shown, one end of a cable or equivalent connection 15, which is passed through guide pulleys 16 carried by one of the purlin posts of the barn with its other end attached to the lever 12 at a point near the lower end of the latter. The other end section 10 has similarly connected thereto a cable 17, passed through similar pulleys and having its other end connected to the lever 12 in a manner similar to the cable 15. Obviously, with this construction, if the lever 12 be moved toward the left, the cable 15 on section 9 will tend to close said section in a manner as illustrated in dotted lines in Fig. 1 of the drawings, assuring a discharge of the hay from the platform, and giving an impetus to the load so as to project the same into the farthest portions of the mow. Likewise, if the lever be moved toward the right, cable 17 will pull on the section 10 and operate the same in a similar manner.

It will be observed that if desired, the sections 9 and 10 may be closed on to the central section 8, and the platform swung to one side out of the way, so as to allow the hay to drop direct from the fork into the center of the mow. As the platform is restored to horizontal position after each tilting thereof, the sections 9 or 10 as the case may be will fall by gravity into open position, as will be obvious. The lever 12 being extended down in proximity to the floor of the barn, is of sufficient length so that the manipulation of the platform is comparatively easy, and the discharge of the hay therefrom to either side of the mow as desired is readily controlled by the operator.

What I claim is:—

1. In combination, a support, a platform hinged to said support to tilt to each side thereof, said platform consisting of a plurality of sections hinged together, and means for tilting the platform.

2. In a device of the character described, a platform mounted to tilt to either side of its support, said platform embodying a central section and two end sections hinged thereto, and means for tilting the platform.

3. In a device of the character described, a platform mounted to tilt to either side of its support and consisting of a central section and two end sections hinged thereto, means for tilting the platform, and means operating one of the end sections of the platform as the latter is tilted.

4. In a device of the character described, a platform support, a platform hinged thereto to tilt to either side of the support and embodying a central section and two end sections hinged to the central section, an operating lever connected with the platform, and cables connected to the lever and the hinged end sections whereby one or the other of said sections is operated as the platform is tilted.

5. In a device of the character described, a platform mounted to tilt to each side of its support and having hinged end sections, an operating lever for tilting the platform, and connections with the lever and hinged sections whereby one or the other is operated as the platform is tilted.

In testimony whereof I affix my signature in presence of two witnesses.

PEDER J. ANDERSON.

Witnesses:
H. A. HUBER,
C. J. G. FIELLSAND.

Copies of this patent may be obtained for five cents each, by addressing the "Commissioner of Patents, Washington, D. C."